(12) United States Patent
Xu et al.

(10) Patent No.: US 9,277,537 B2
(45) Date of Patent: Mar. 1, 2016

(54) METHOD FOR TRIGGERING APERIODIC SOUNDING REFERENCE SYMBOL, BASE STATION AND USER EQUIPMENT

(71) Applicant: FUJITSU LIMITED, Kawasaki-shi, Kanagawa (JP)

(72) Inventors: Haibo Xu, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 162 days.

(21) Appl. No.: 13/936,709

(22) Filed: Jul. 8, 2013

(65) Prior Publication Data

US 2013/0294382 A1 Nov. 7, 2013

Related U.S. Application Data

(63) Continuation of application No. PCT/CN2011/070074, filed on Jan. 7, 2011.

(51) Int. Cl.
*H04L 1/00* (2006.01)
*H04W 72/04* (2009.01)
(Continued)

(52) U.S. Cl.
CPC .......... *H04W 72/04* (2013.01); *H04W 76/066* (2013.01); *H04L 5/0048* (2013.01); *H04L 25/0224* (2013.01); *H04W 24/10* (2013.01); *H04W 74/0833* (2013.01)

(58) Field of Classification Search
CPC ..... H04W 72/04; H04W 72/05; H04W 72/06; H04W 84/08; H04W 84/09; H04W 84/10
USPC .......................... 370/329, 330, 341, 344, 343
See application file for complete search history.

(56) References Cited

U.S. PATENT DOCUMENTS

2010/0080187 A1* 4/2010 Papasakellariou et al. ... 370/329
2010/0103902 A1* 4/2010 Kim et al. ..................... 370/330
2011/0083066 A1* 4/2011 Chung et al. .................. 714/807

FOREIGN PATENT DOCUMENTS

CN 101772180 7/2010
CN 101772180 A 7/2010
(Continued)

OTHER PUBLICATIONS

Office Action issued for corresponding Mexican Patent Application No. MX/a/2013/007940 dated Oct. 24, 2014, with an English translation.
(Continued)

*Primary Examiner* — Dady Chery
(74) *Attorney, Agent, or Firm* — Myers Wolin, LLC

(57) ABSTRACT

A method for triggering an aperiodic sounding reference symbol, a base station and a user equipment. Including not releasing by a user equipment a resource used for transmitting an aperiodic sounding reference symbol configured by a base station for the user equipment, if the user equipment desynchronizes or the user equipment fails to transmit a scheduling request to the base station; executing a random access procedure by the user equipment; and transmitting by the user equipment the aperiodic sounding reference symbol on the unreleased resource used for transmitting an aperiodic sounding reference symbol configured by a base station for the user equipment according to indication information issued by the base station for indicating the user equipment to transmit an aperiodic sounding reference symbol if the random access succeeds.

15 Claims, 11 Drawing Sheets

(51) Int. Cl.
  *H04W 76/06* (2009.01)
  *H04W 24/10* (2009.01)
  *H04L 5/00* (2006.01)
  *H04W 74/08* (2009.01)
  *H04L 25/02* (2006.01)

(56) References Cited

FOREIGN PATENT DOCUMENTS

| | | |
|---|---|---|
| CN | 101827444 | 9/2010 |
| JP | 2011-520376 A | 7/2011 |
| WO | 2009/041785 A2 | 4/2009 |
| WO | 2009/113772 | 9/2009 |
| WO | 2009/136706 A2 | 11/2009 |

OTHER PUBLICATIONS

Office Action issued for corresponding Taiwanese Patent Application No. 10321828910 dated Dec. 29, 2014 with a partial English translation.

Office Action issued for corresponding Taiwanese Patent Application No. 100146176 dated Dec. 29, 2014 with a partial English translation.

Office Action issued for corresponding Taiwanese Patent Application No. 100146176, dated Mar. 27, 2014, with an English translation.

Notice of Preliminary Rejection issued for corresponding Korean Patent Application No. 10-2013-7020833, mailed on Jun. 25, 2014, with an English translation.

Office Action issued for corresponding Mexican Patent Application No. MX/a/2013/007940 dated Jul. 24, 2014, with an English translation.

International search report issued for corresponding International Patent Application No. PCT/CN2011/070074, mailed Sep. 8, 2011, with English translation.

Official Action issued for corresponding Russian Patent Application No. 2013136911 dated Dec. 8, 2014, with a partial English translation.

Notice of Reason for Rejection issued for corresponding Japanese patent application No. 2013-547791, mailed on Jan. 6, 2015 with an English translation.

Motorola, "LTE—A Dynamic Aperiodic SRS—Triggering, Duration, Timing, and Carrier Aggregation", Agenda Item: 6.5.2.1, 3GPP TSG RAN WG1 Meeting #61, R1-103187, Montreal, Canada, May 10-14, 2010.

Office Action issued by the Canadian Intellectual Property Office for corresponding Canadian Patent Application No. 2,823,966, dated May 1, 2015.

First Notification of Office Action issued by the State Intellectual Property Office of China for corresponding Chinese Patent Application No. 201180064193.1, dated Oct. 29, 2015, with an English translation.

Office Action issued by the Mexican Institute of Industrial Property for Corresponding Mexican Patent Application No. MX/a/2015/008383, dated Dec. 16, 2015, with an English translation.

\* cited by examiner

METHOD FOR TRIGGERING APERIODIC SOUNDING REFERENCE SYMBOL, BASE STATION AND USER EQUIPMENT

CROSS-REFERENCE TO RELATED APPLICATIONS

This application is a continuation of International Application No. PCT/CN2011/070074, filed on Jan. 7, 2011, which is hereby incorporated by reference in its entirety.

FIELD OF THE INVENTION

This invention relates to the field of communications, and more particularly, to a method for triggering an aperiodic sounding reference symbol, to a base station and to a user equipment.

BACKGROUND OF THE RELATED ART

The sounding reference symbol (SRS) is used to measure uplink radio channel state information (CSI) between a user equipment (UE) and a base station, e-NodeB (eNB).

In the long-term Evolution (LTE) system, the UE periodically transmits the uplink SRS on the last data symbol of a transmission sub-frame according to such parameters indicated by the base station eNB as transmission bandwidth, starting position of frequency domain, cyclic shift of sequence, period and sub-frame offset, etc. The base station eNB judges the uplink CSI of the UE according to the received SRS, and performs operations of frequency domain selection scheduling, closed-loop power controlling, and so on according to the CSI as obtained.

In the Long-term Evolution-Advanced (LTE-A) system, in order to improve the utilization rate of SRS resources and to enhance flexibility in scheduling of the resources, an aperiodic SRS mechanism is further introduced. To facilitate description, periodically transmitted SRSs are hereinafter referred to as periodic SRSs, while aperiodically transmitted SRSs are referred to as aperiodic SRSs. Currently, the triggering is performed by downlink control information (DCI) for uplink transmission as transmitted from the base station, namely, the user equipment is notified by DCI format 0 and DCI format 4 as to whether to transmit the aperiodic SRS. In this case, the base station eNB can configure for the UE a resource set used to transmit the aperiodic SRS by signaling of a radio resource control (RRC) layer.

Under the following two circumstances in the LTE and the LTE-A systems, in order to transmit the uplink data, the UE firstly needs to perform random access 1) after time-over of an uplink time advance timer (TAT) of the UE occurs, and 2) after a maximum number of transmissions for the UE to transmit a scheduling request (SR) to the base station over a physical uplink control channel (PUCCH) has been reached. After successful random access, the base station eNB may schedule uplink resources for the UE to transmit the uplink data.

In order to effectively schedule uplink physical resources necessary for the UE to transmit the uplink data, it is firstly necessary for the base station eNB to obtain the uplink CSI of the UE. Currently, in order to obtain the uplink CSI of the UE, it is only possible for the base station to perform channel estimation with periodic SRSs transmitted from the UE. However, after occurrence of the aforementioned two circumstances, the UE will release periodic SRSs resources. Accordingly, the currently feasible method is that the base station eNB needs to configure the resources used to transmit the periodic SRS for the UE by signaling of the RRC layer. Then, the UE does not transmit the periodic SRS immediately, but waits until the coming of the transmission time, and transmits the periodic SRS to the base station eNB at preconfigured transmission time. On receipt of the periodic SRS, the base station eNB obtains the uplink CSI from the SRS to thereby schedule resources according to the CSI.

The inventors found the following defects in the prior art during the process of developing the present invention: since it is firstly necessary for the base station to configure resources used to transmit the periodic SRS for the UE by signaling of the RRC layer, while it is necessary for the UE to wait for the coming of the transmission time before transmitting the SRS to the base station eNB, a relatively great time delay occurs when the uplink CSI is obtained by the base station eNB, thereby making it impossible for the base station eNB to rapidly schedule the UE when uplink data need to transmit. Further, under the aforementioned circumstances, there is no effective method of obtaining channel state information by making use of aperiodic SRS in the LTE-A system.

SUMMARY

Certain embodiments aim to provide a method for triggering an aperiodic sounding reference symbol, a base station and a user equipment, in which the user equipment (UE) may not release resources configured for it by the base station to transmit an aperiodic sounding reference symbol (SRS) after time-over of a time advance timer (TAT) or after failure to transmit a scheduling request (SR) over PUCCH (a maximum number of transmissions of the scheduling request has been reached), and can transmit the aperiodic SRS to the base station by making use of the resources, so that the base station rapidly obtains uplink channel state information (CSI) of the UE to thereby rapidly perform scheduling for a transmission of uplink data of the UE.

According to one aspect of certain embodiments, there is provided a method for triggering an aperiodic sounding reference symbol, comprising:

not releasing by a user equipment a resource used for transmitting an aperiodic sounding reference symbol configured by a base station for the user equipment, if the user equipment desynchronizes or the user equipment fails to transmit a scheduling request to the base station;

executing a random access procedure by the user equipment; and transmitting by the user equipment the aperiodic sounding reference symbol on the unreleased resource used for transmitting an aperiodic sounding reference symbol configured by a base station for the user equipment according to indication information issued by the base station for indicating the user equipment to transmit an aperiodic sounding reference symbol if the random access succeeds.

According to another aspect of certain embodiments, there is provided a method for triggering an aperiodic sounding reference symbol, comprising:

not releasing by a user equipment a resource used for transmitting an aperiodic sounding reference symbol configured by a base station for the user equipment, if the user equipment desynchronizes or the user equipment fails to transmit a scheduling request to the base station;

executing a random access procedure by the user equipment;

determining by the user equipment whether to transmit an aperiodic sounding reference symbol according to the type of indication information contained in a random access response message transmitted by the base station indicating the user equipment whether to transmit an aperiodic sounding reference symbol; and transmitting by the user equipment the aperiodic sounding reference symbol on the unreleased resource used for transmitting an aperiodic sounding reference symbol configured by the base station for the user equipment if the user equipment determines to transmit the aperiodic sounding reference symbol.

According to yet another aspect of certain embodiments, there is provided a method for triggering an aperiodic sounding reference symbol, comprising:

transmitting by a base station a random access response message of a random access procedure, the random access response message containing indication information indicating a user equipment whether to transmit an aperiodic sounding reference symbol, to enable the user equipment to determine whether to transmit the aperiodic sounding reference symbol according to the type of the indication information.

According to still another aspect of certain embodiments, there is provided a user equipment, comprising:

a first resource processing unit for not releasing a resource used for transmitting an aperiodic sounding reference symbol configured by a base station for the user equipment when the user equipment desynchronizes or the user equipment fails to transmit a scheduling request to the base station;

a first random access unit for executing a random access procedure; and a first information transmitting unit for transmitting the aperiodic sounding reference symbol on the unreleased resource used for transmitting an aperiodic sounding reference symbol configured by the base station for the user equipment according to indication information issued by the base station for indicating the user equipment to transmit an aperiodic sounding reference symbol when the random access succeeds.

According to one aspect of certain embodiments, there is provided a user equipment, comprising:

a second resource processing unit for not releasing a resource used for transmitting an aperiodic sounding reference symbol configured by a base station for the user equipment when the user equipment desynchronizes or the user equipment fails to transmit a scheduling request to the base station;

a second random access unit for executing a random access procedure;

a first determining unit for determining whether to transmit an aperiodic sounding reference symbol according to the type of indication information contained in a random access response message transmitted by the base station indicating the user equipment whether to transmit an aperiodic sounding reference symbol; and a second information transmitting unit for transmitting the aperiodic sounding reference symbol on the unreleased resource used for transmitting an aperiodic sounding reference symbol configured by the base station for the user equipment when the user equipment determines to transmit the aperiodic sounding reference symbol.

According to one aspect of certain embodiments, there is provided a base station, comprising:

a third receiving unit for receiving a random access preamble transmitted by an user equipment;

a message generating unit for generating a corresponding random access response message according to a preconfigured format of the random access response message or according to the preconfigured format of the random access response message corresponding to the type of the random access, wherein indication information indicating whether the user equipment to transmit an aperiodic sounding reference symbol is contained in the random access response message; and a third information transmitting unit for transmitting to the user equipment the random access response message such that the user equipment determines whether to transmit an aperiodic sounding reference symbol according to the type of the indication information contained in the random access response message.

According to one aspect of certain embodiments, there is provided a computer-readable program, wherein when the program is executed in a user equipment, the program enables the computer to carry out the method for triggering an aperiodic sounding reference symbol in the user equipment.

According to one aspect of certain embodiments, there is provided a storage medium in which a computer-readable program is stored, wherein the computer-readable program enables the computer to carry out the method for triggering an aperiodic sounding reference symbol in a user equipment.

According to one aspect of certain embodiments, there is provided a computer-readable program, wherein when the program is executed in a base station, the program enables the computer to carry out the method for triggering an aperiodic sounding reference symbol in the base station.

According to one aspect of certain embodiments, there is provided a storage medium in which a computer-readable program is stored, wherein the computer-readable program enables the computer to carry out the method for triggering an aperiodic sounding reference symbol in the base station.

Advantageous effects of certain embodiments are as follows. The user equipment (UE) does not release the resource configured for it by the base station to transmit an aperiodic sounding reference symbol (SRS) after time-over of a time advance timer (TAT) or after failure to transmit a scheduling request (SR) over PUCCH (a maximum number of transmissions of the scheduling request has been reached), and after receipt from the base station of indication information indicating it to transmit the aperiodic SRS, makes use of the unreleased and preconfigured resource to transmit the aperiodic SRS to the base station according to the indication information, so that the base station rapidly obtains uplink channel state information (CSI) of the UE to thereby rapidly perform scheduling for a transmission of uplink data of the UE.

With reference to detailed explanations below and the accompanying drawings, specific embodiments are disclosed in detail, and modes applicable to the certain principles of embodiments are pointed out. As should be understood, embodiments of the present invention are not restricted in scope thereby. Within the spirits and provisos of the claims attached herewith, the embodiments of the present invention include various changes, modifications and equivalencies.

Features described and/or illustrated for one particular embodiment can be used in one or more other embodiments in the same or similar mode, combined with features of other embodiments, or in replace of features of other embodiments.

As should be stressed, the wording of "including/comprising/containing" as used in this paper indicates the presence of a feature, an integral part, a step or a component part, but does not exclude the presence or addition of one or more other features, integral parts, steps or component parts.

EXPLANATIONS OF THE ACCOMPANYING DRAWINGS

SPECIFIC EMBODIMENTS FOR CARRYING OUT THE INVENTION

Various embodiments are described in greater detail below with reference to the accompanying drawings. These embodiments are merely exemplary in nature, rather than restrictive to the present invention. To make it easy for persons skilled in the art to acquaint themselves with the principles and embodiments, triggering of an aperiodic SRS in a Long Term Evolution Advanced (LTE-A) system is taken as an example upon introduction of the embodiments of the present invention. However, as should be understood, the present invention is not restricted to this system alone, and it is applicable to any system in which triggering aperiodic SRSs are involved.

Figure 1:
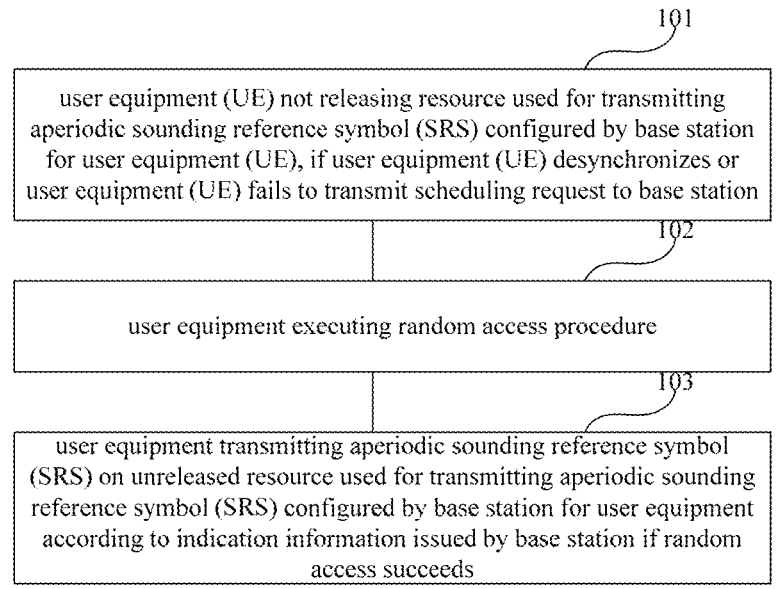
FIG. 1 is a flowchart of a method for triggering an aperiodic sounding reference symbol according to Embodiment 1.

FIG. 1 is a flowchart of a method for triggering an aperiodic sounding reference symbol according to Embodiment 1. As shown in FIG. 1, the method comprises the following steps:

Step 101, in which a user equipment (UE) does not release a resource used for transmitting an aperiodic sounding reference symbol (SRS) configured by a base station for the user equipment (UE), if the user equipment (UE) desynchronizes or the user equipment (UE) fails to transmit a scheduling request (SR) to the base station;

Step 102, in which a random access procedure is executed by the user equipment (UE); and Step 103, in which if the random access succeeds, according to indication information for, which is issued by the base station, indicating the user equipment (UE) to transmit an aperiodic sounding reference symbol (SRS), the user equipment (UE) transmits the aperiodic sounding reference symbol (SRS) on the unreleased resource, which is configured by the base station for the user equipment (UE) with respect to the transmission of aperiodic sounding reference symbol (SRS).

In Step 101 of this embodiment, if time-over occurs at a time advance timer (TAT) of the UE for maintaining uplink synchronization, it can be determined that the UE desynchronizes. When the UE maintains uplink synchronization and desires to transmit uplink data, it transmits a scheduling request to the base station so as to request an uplink resource for transmitting the uplink data. If the uplink resource allocated to the UE by the base station has not yet been obtained until the number of transmissions of the scheduling request (SR) exceeds a predetermined value, it is determined that transmission of the scheduling request by the UE has failed.

In Step 101, when the aforementioned circumstance occurs, the UE does not release the resource used for transmitting the aperiodic SRS, so as to make use of the resource to transmit the aperiodic SRS on receipt of indication information sent from the base station indicating to transmit the aperiodic SRS. Accordingly, the base station rapidly obtains uplink channel state information (CSI) of the UE to thereby rapidly perform scheduling for a transmission of uplink data by the UE.

In this embodiment, when the UE desynchronizes in Step 101 and it desires to transmit uplink data to the base station, it is necessary for the UE to execute a random access procedure so as to achieve uplink synchronization and to notify the base station of its desire to transmit the uplink data. When the UE that maintains uplink synchronization fails to transmit the SR to the base station in Step 101, in order to notify the base station of its desire to transmit the uplink data, it is necessary for the UE to transmit the random access procedure.

Thus, when the aforementioned circumstance occurs in Step 101, the UE executes a random access procedure in Step 102, in which the random access procedure may either be a contention-free or contention-base random access, and the procedure is similar to that of the prior art. Contention-base and contention-free random access procedures are briefly described below with reference to FIGS. 2A and 2B.

Figure 2A:
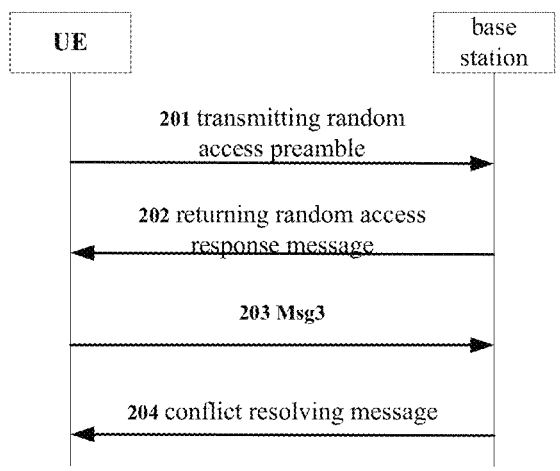
FIG. 2A is a flowchart of a contention-base random access procedure.

FIG. 2A is a flowchart of a contention-base random access procedure according to Embodiment 1. In the contention-based random access procedure, random access is initiated by the UE or triggered by the base station. Example is taken here with the UE initiating the random access for explanation.

As shown in FIG. 2A, the following steps are included:

Step 201, in which the UE transmits a random access preamble to the base station;

Step 202, in which the base station receives the random access preamble, and returns a random access response (RAR) message to the UE;

wherein the RAR message may include such information as time adjustment information for uplink synchronization, initial allocation of uplink resources (subsequent Msg3 to be transmitted by the user), and temporary radio network temporary identifier C-RNTI, etc.;

Step 203, in which the UE obtains uplink time synchronization and an uplink resource after receipt of the RAR message; however, since it is by now impossible to determine whether the RAR message is transmitted to the UE or to other user equipment, the UE transmits an Msg3 message to the base station so as to resolve the above random access conflict; moreover, the UE simultaneously starts a mac-contention resolution timer;

wherein the Msg3 message carries therein identification information of the UE to differentiate different user equipments;

Step 204, in which the UE receives a contention resolution message returned from the base station in the case time-over does not occur at the mac-contention resolution timer, and then the UE can determine that the random access succeeds this time; otherwise, the random access procedure fails.

Figure 2B:
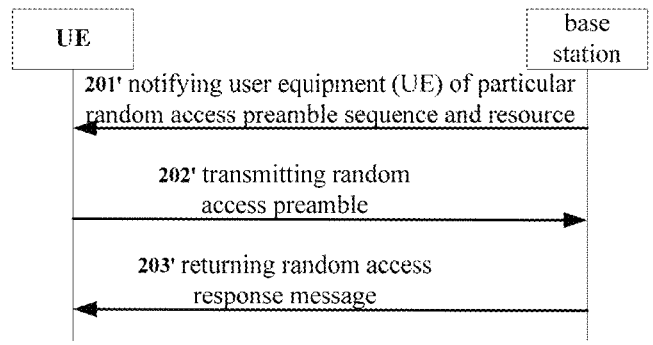
FIG. 2B is a flowchart of a contention-free random access procedure.

FIG. 2B is a flowchart of a contention-free random access procedure according to Embodiment 1, in which the contention-free random access procedure is triggered by the base station. The base station notifies the UE in advance of using particular contention-free random access preamble sequence and resource to access, and thus it is possible to avoid possible conflict and reduce time delay of the random access. Since no problem concerning conflict needs be resolved, the contention-free random access procedure is relatively simple. As shown in FIG. 2B, the following steps are included:

Step 201', in which the base station notifies the UE in advance to use particular contention-free random access preamble sequence and resource;

Step 202', in which the UE transmits to the base station a particular contention-free random access preamble according to the particular random access preamble sequence notified by the base station;

Step 203', in which the base station receives the random access preamble, can determine the contention-free random access initiated by the UE according to the preamble identifier, and returns an RAR message to the UE;

wherein the RAR message may include such information as time adjustment information for uplink synchronization, resources allocated to the UE necessary for transmitting uplink data, and temporary radio network temporary identifier C-RNTI, etc.

In this embodiment, in the case where the UE successfully executes random access in Step 102, in Step 103, when the UE receives indication information for, which is issued from the base station, indicating the UE to transmit the aperiodic SRS, the aperiodic SRS is transmitted on the unreleased resource. Thus, the base station can rapidly obtain uplink channel state information (CSI) of the UE to thereby rapidly perform scheduling for a transmission of uplink data of the UE.

In this embodiment, when it is needed for the UE to transmit the aperiodic SRS, the base station may make use of physical downlink control information (DCI) to transmit indication information indicating the UE to transmit the aperiodic SRS, and the physical DCI is transmitted over a physical downlink control channel (PDCCH). Moreover, the format whereby the physical DCI is carried over the PDCCH is referred to as the downlink control information (DCI) format. In the LTE system, the DCI format is divided into 10 types as DCI format 0, format 1, format 1A, format 1B, format 1C, format 1D, format 2, format 2A, format 3, and format 3A. In the LTE-A system, a DCI format 4 is further included besides the aforementioned 10 types of DCI format.

In this embodiment, the base station may trigger the UE to transmit the aperiodic SRS by DCI format 0 or DCI format 4.

When DCI format 0 is used to trigger the UE to transmit the aperiodic SRS, a new bit is added to the DCI format 0. The base station may trigger the UE to transmit the aperiodic SRS with the newly added bit. For example, when the bit is 1, the UE is indicated to transmit the aperiodic SRS. The resource set necessary to transmit the aperiodic SRS is preconfigured by high level signaling, namely radio resource control (RRC) protocol. Moreover, there is only one resource set available for selection. When the bit is 0, the UE is indicated not to transmit the aperiodic SRS.

Table 1 illustrates the carrying information and length for DCI format 0 in the LTE system according to the embodiments, wherein the bit that carries the indication information is 1 bit.

TABLE 1

| | |
|---|---|
| Flag for DCI 0/1A | 1 |
| Hopping flag | 1 |
| Resource allocation | 11 |
| Modulation and coding scheme and redundancy version | 5 |
| New data indicator | 1 |
| Power control for PUSCH | 2 |
| Cyclic shift for DMRS and OCC index | 3 |
| A-CQI request | 2 |
| A-SRS trigger | 1 |
| Multi-cluster flag | 1 |
| Payload | 28 |
| Cyclic redundancy check (CRC) | 16 |
| Total payload | 44 |

When DCI format 4 is used to trigger the UE to transmit the aperiodic SRS, two bits (2 bit) are provided in the DCI format 4 to carry the indication information. One state of the 2 bit in the DCI format 4, "00" for instance, indicates that it is unnecessary for the UE to transmit the aperiodic SRS, while the remaining three states, "01/10/11", all indicate the necessity for the UE to transmit the aperiodic SRS, as well as the resources used therein. Here, the resource set needed to transmit the aperiodic SRS is preconfigured by RRC signaling, and three resource sets shall be configured at the same time. The three states for triggering the aperiodic SRS in DCI format 4 respectively correspond to the three resource sets used for transmitting the aperiodic SRS after the trigger.

Table 2 illustrates the carrying information and length for DCI format 4 in the LTE-A system according to certain embodiments, wherein the bit that carries the indication information is 2 bit.

TABLE 2

| | |
|---|---|
| Resource allocation | 11 |
| Power control for PUSCH | 2 |
| Cyclic shift for DMRS and OCC | 3 |
| A-CQI request | 2 |
| A-SRS request | 2 |
| Multi-cluster flag | 1 |
| Modulation and coding scheme for $1^{st}$ TB | 5 |
| New data inDCIator for $1^{st}$ TB | 1 |
| Modulation and coding scheme for $2^{nd}$ TB | 5 |
| New data inDCIator for $2^{nd}$ TB | 1 |
| PMI/RI | 3/6 |
| Payload | 36/39 |

Thus, on receipt of the DCI format 0 or DCI format 4 transmitted from the base station, the UE can read indication information therefrom, and if it is determined that the indication information indicates the UE to transmit the aperiodic SRS, the UE transmits the aperiodic SRS on the unreleased resource.

In this embodiment, besides indicating the UE to transmit the aperiodic SRS with DCI format 0 and DCI format 4, downlink control information in other formats may as well be used to indicate the UE to transmit the aperiodic SRS, for instance, the aperiodic SRS is transmitted with DCI format 1A and so on. The indicating mode is similar to those of DCI format 0 and DCI format 4, and is hence not repetitively described here. But there is no restriction here, as any other information could also be used to carry.

As can be known from the above embodiment, the UE does not release the resource configured for it by the base station to transmit the aperiodic SRS after time-over of the time advance timer (TAT) or after failure to transmit the scheduling request (SR) over PUCCH (a maximum number of transmissions of the scheduling request has been reached). Moreover, after the UE succeeds in the random access and receives the indication information sent from the base station indicating it to transmit the aperiodic SRS, it can make use of the unreleased resource to transmit the aperiodic SRS to the base station according to the indication information, so that the base station rapidly obtains uplink channel state information (CSI) of the UE to thereby rapidly perform scheduling for an uplink data transmission of the UE.

Embodiments of the present invention further provide a user equipment, as described in greater detail in the following embodiment. Since the principles whereby the user equipment resolves the problem are similar to the principles whereby the method for triggering a sounding reference symbol based on the user equipment solves the problem, implementation of the user equipment may refer to the implementation of the method, and repetitive contents will not be reiterated in this context.

Figure 3:
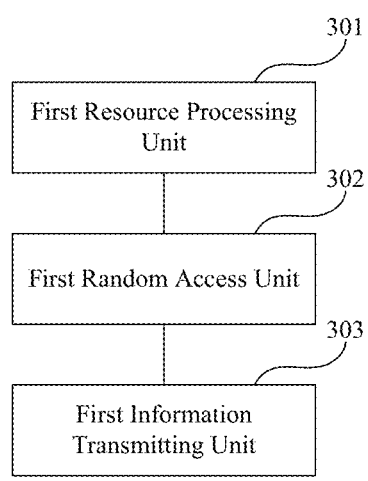
FIG. 3 is a structural diagram of a user equipment according to Embodiment 2.

FIG. 3 is a structural diagram of a user equipment according to Embodiment 2. As shown in FIG. 3, the user equipment includes a first resource processing unit 301, a first random access unit 302 and a first information transmitting unit 303.

The first resource processing unit 301 does not release a resource used for transmitting an aperiodic sounding reference symbol configured by a base station for the user equipment (UE) when the user equipment (UE) desynchronizes or the user equipment (UE) fails to transmit a scheduling request (SR) to the base station.

The first random access unit 302 executes a random access procedure; the process of interaction between the random access unit 302 and the base station is as shown in Embodiment 1 and FIGS. 2A and 2B, and no repetition will be made here.

The first information transmitting unit 303 transmits the aperiodic sounding reference symbol (SRS) on the unreleased resource configured by the base station for the user equipment with respect to the transmission of aperiodic sounding reference symbol (SRS) according to indication information issued by the base station for indicating the user equipment to transmit an aperiodic sounding reference symbol (SRS) when the random access succeeds.

The indication information issued by the base station can be carried by DCI format 0 or DCI format 4 or DCI format 1A, which is not restricted, as any other information could as well be used to carry, as shown in Embodiment 1, and no repetition will be made here.

As can be known from the above embodiment, the UE does not release the resource configured for it by the base station to transmit an aperiodic SRS after time-over of a time advance timer (TAT) or after failure to transmit a scheduling request (SR) over PUCCH (a maximum number of transmissions of the scheduling request has been reached). Moreover, after the UE succeeds in random access and receives the indication information sent from the base station indicating it to transmit an aperiodic SRS, it can make use of the unreleased resource to transmit the aperiodic SRS to the base station according to the indication information, so that the base station rapidly obtains uplink channel state information (CSI) of the UE to thereby rapidly perform scheduling for an uplink data transmission of the UE.

Figure 4:
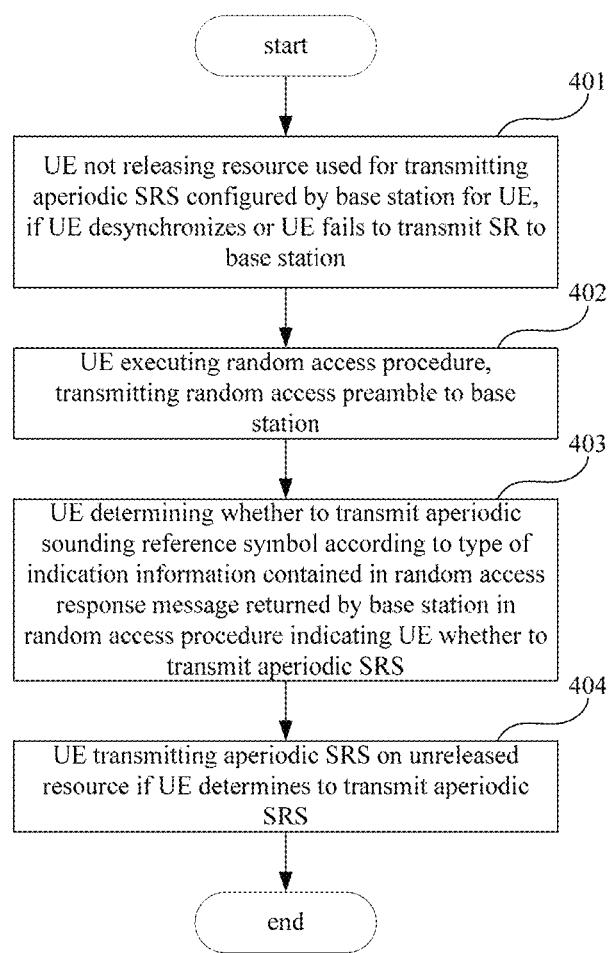
FIG. 4 is a flowchart of a method for triggering an aperiodic sounding reference symbol according to Embodiment 3.

FIG. 4 is a flowchart of a method for triggering an aperiodic sounding reference symbol according to Embodiment 3. As shown in FIG. 4, the method comprises the following steps:

Step 401, in which a user equipment (UE) does not release a resource used for transmitting an aperiodic sounding reference symbol (SRS) configured by a base station for the user equipment (UE), if the user equipment (UE) desynchronizes or the user equipment (UE) fails to transmit a scheduling request (SR) to the base station;

Step 402, in which the user equipment (UE) executes a random access procedure, which may either be a contention-based or contention-free random access procedure; the procedure is as shown in FIGS. 2A and 2B of Embodiment 1, where the user equipment (UE) transmits a random access preamble on its own initiative or under trigger by the base station;

Step 403, in which the user equipment (UE) determines whether to transmit an aperiodic sounding reference symbol (SRS) according to the type of indication information for, which is contained in a random access response message returned by the base station in the random access procedure, indicating the user equipment (UE) whether to transmit an aperiodic sounding reference symbol (SRS);

Step 404, in which the user equipment (UE) transmits the aperiodic sounding reference symbol (SRS) on the unreleased resource used for transmitting an aperiodic sounding reference symbol (SRS) configured by the base station for the user equipment (UE) if the user equipment (UE) determines to transmit the aperiodic sounding reference symbol (SRS).

In this embodiment, when the UE desynchronizes in Step 401 and the UE desires to transmit uplink data to the base station, it needs to execute a random access procedure so as to achieve uplink synchronization and to notify the base station of its desire to transmit the uplink data. When the UE that maintains uplink synchronization fails to transmit the SR to the base station in Step 401, it needs to transmit the random access procedure so as to notify the base station of its desire to transmit the uplink data. Thus, when the aforementioned circumstance occurs in Step 401, in Step 402, the UE executes a random access procedure, and the UE transmits a random access preamble to the base station. On receipt of the random access preamble, the base station can generate and return an RAR message containing indication information indicating the UE to transmit an aperiodic SRS, the process of which will be described below. Herein, if the base station determines that it is necessary for the UE to transmit the aperiodic sounding reference symbol, the indication information indicates the UE to transmit the aperiodic SRS; otherwise, the indication information indicates the UE not to transmit the aperiodic SRS.

Thus, in Step 403, when the UE receives the RAR message, it can read the indication information, and determine whether to transmit the aperiodic SRS according to the type of the indication information. The specific determining process will be described below with reference to FIGS. 5 and 6.

In this embodiment, the indication information contained in the RAR message is carried by a reserved bit R in the random access response message. Alternatively, it is carried by a newly added bit, and in this case, a bit can be newly added in an uplink bandwidth grant (UL Grant) field to carry the indication information, but the total number of bits in the RAR message remains unchanged.

Herein, the number of bit may be 1, for instance, when the state corresponding to the 1 bit is "1", this represents indicating the UE to transmit the aperiodic SRS; when the state corresponding to the 1 bit is "0", this represents indicating the UE not to transmit the aperiodic SRS. However, there is no restriction to the aforementioned bit, as any other bit may as well be used to carry the indication information.

As can be known from the above, since different carrying modes are used, the RAR message can correspond to different formats, and RAR messages of different formats correspond to different processing modes.

Herein, the format of the RAR message can be preconfigured by the base station and notified to the UE, so that the UE performs a corresponding process according to the configured format on receipt of the RAR message.

Alternatively, the base station preconfigures the corresponding format of the RAR message according to the type of the random access, and notifies the UE, so that the UE performs a corresponding process according to the configured format corresponding to the type of the random access on receipt of the RAR message.

Under such a circumstance, considering the problem of compatibility with prior art technology, the base station can only configure the format of the random access response message corresponding to a contention-free random access procedure, and notify the UE, so that the UE processes the received RAR message by using the preconfigured format of the random access response message corresponding to the contention-free random access procedure under the circumstance of contention-free random access. As for the format of the random access response message corresponding to a contention-based random access procedure, agreement can be made with the UE to adopt the mode by default, namely the original format.

In this embodiment, the method further includes the following preparation procedure, namely receiving resource information configured by the base station for the UE to transmit the aperiodic SRS.

Alternatively, the following step may further be included.

Namely, the UE receives the format of the random access response message configured by the base station for the UE; or the UE receives the format of the random access response message corresponding to the type of the random access procedure and configured by the base station for the UE.

Figure 5:
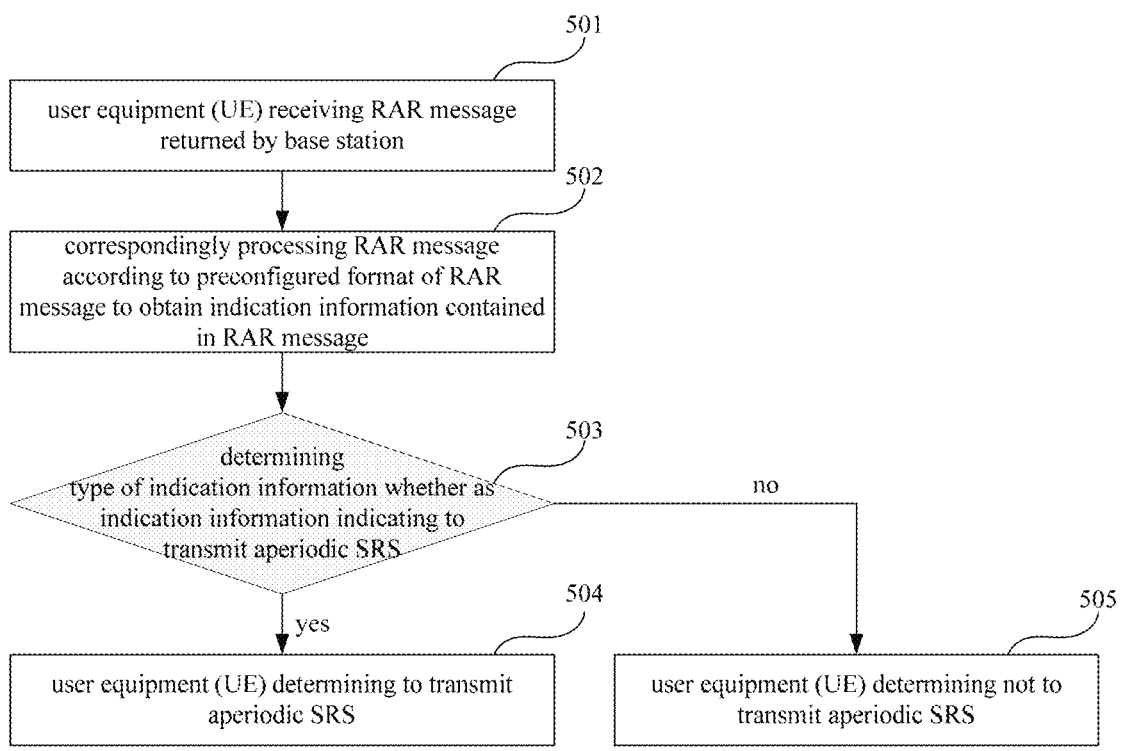
FIG. 5 is one of the flowcharts for carrying out step 403 in Embodiment 3.

FIG. 5 is one of the flowcharts for carrying out step 403 in Embodiment 3, in which the format of the RAR message is preconfigured by the base station and notified to the UE, so that the UE performs a corresponding process according to the configured format on receipt of the RAR message.

As shown in FIG. 5, the following steps are included:

Step 501, in which the UE receives the RAR message returned by the base station according to the random access preamble transmitted by the UE;

wherein the RAR message contains indication information indicating the UE whether to transmit an aperiodic SRS, and wherein regardless of a contention-based or contention-free random access procedure, when the base station generates the RAR message, the format of the RAR message is a format preconfigured by the base station.

For instance, the format of the RAR message can be a format of carrying the indication formation by a newly added bit or a reserved bit R in the random access response message.

As for the contention-based random access procedure, when the base station generates the RAR message, indication information in the RAR message is set as "0". As for the contention-free random access procedure, when the base station generates the RAR message, if the base station determines that it is necessary for the UE to transmit the aperiodic SRS, the indication information is set as "1"; otherwise, the indication information is set as "0".

Step 502, in which the RAR message is correspondingly processed according to a preconfigured format of the RAR message, so as to obtain the indication information contained in the RAR message;

wherein processing the RAR message is to decode the RAR message.

Step 503, in which it is determined if the type of the indication information shows to transmit the aperiodic SRS. Step 504 is executed when the determination result is yes, otherwise Step 505 is executed.

Herein, for instance, if the indication information is "1", this represents to transmit the aperiodic SRS; if the indication information is "0", this represents not to transmit the aperiodic SRS.

However, the aforementioned indication information is merely exemplified in this invention, as any other identifiers may also be used to represent.

Step 504, in which the determination result in Step 503 is yes, namely the type of the indication information shows to transmit the aperiodic SRS, and the UE determines to transmit the aperiodic SRS.

Step 505, in which the determination result in Step 503 is no, namely the type of the indication information shows not to transmit the aperiodic SRS, and the UE determines not to transmit the aperiodic SRS.

As can be known from the above embodiment, regardless of whether the UE executing the contention-free or the contention-based random access procedure at the user side, the base station generates a corresponding RAR message according to the preconfigured RAR format, and the UE can process the received RAR message according to the preconfigured format of the RAR message, so as to obtain the indication information in the RAR message. Herein, if the type of the indication information is "1", it can be determined to transmit the aperiodic SRS; if the type of the indication information is "0", it can be determined not to transmit the aperiodic SRS. Under such a circumstance, the UE does not need to differentiate the types of the random access procedure while processing the received RAR message.

Figure 6:
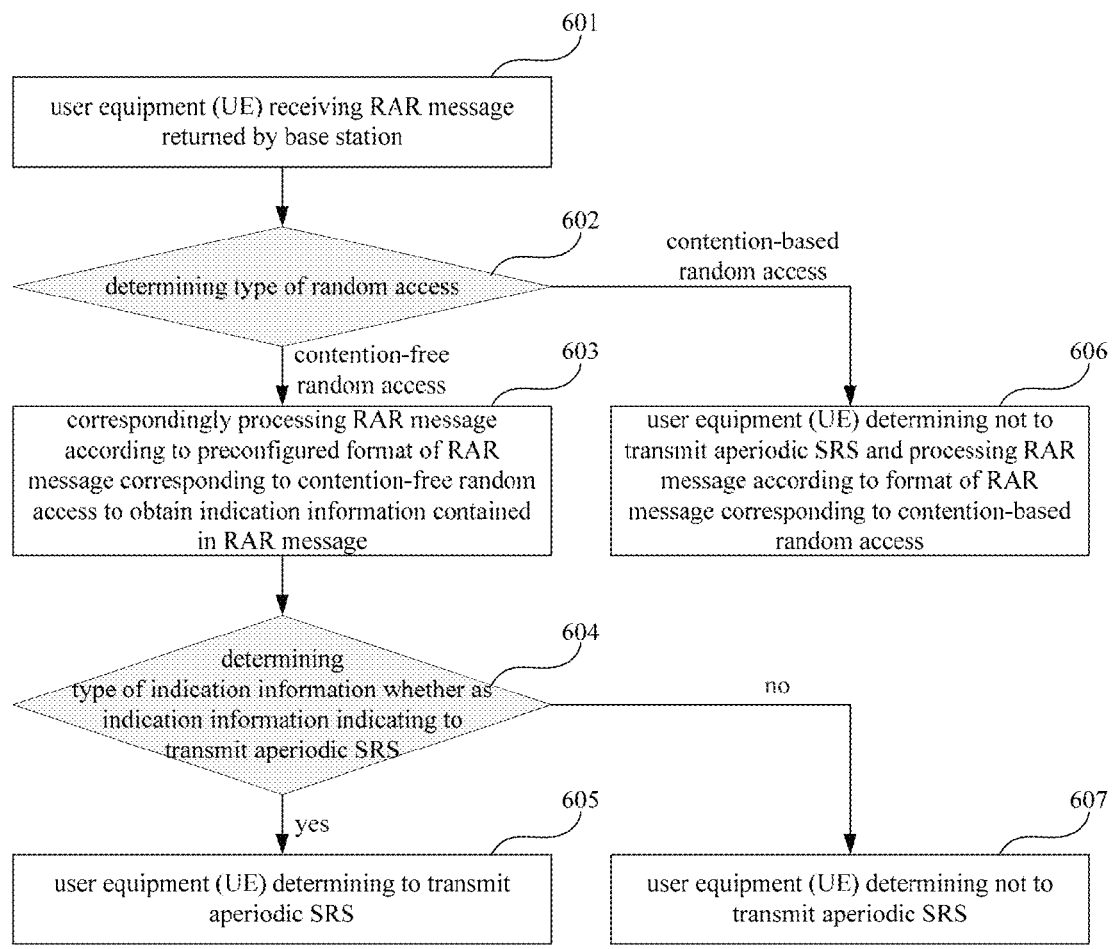
FIG. 6 is another one of the flowcharts for carrying out step 403 in Embodiment 3.

FIG. 6 is another one of the flowcharts for carrying out step 403 in Embodiment 3, in which the format of the RAR message is preconfigured by the base station and notified to the UE, and the format of the RAR message corresponds to the type of the random access, so that the UE correspondingly processes the received RAR message according to the type of the RAR message corresponding to the type of the random access on receipt of the RAR message. Specifically, the base station can only configure the format of the random access response message corresponding to a contention-free random access procedure, and notify the UE. As for the format of the random access response message corresponding to a contention-based random access procedure, agreement can be made with the UE to adopt the mode by default.

As shown in FIG. 6, the following steps are included:

Step 601, in which the UE receives the RAR message returned by the base station according to the random access preamble transmitted by the UE;

wherein the RAR message contains indication information indicating the UE whether to transmit an aperiodic SRS.

The format of the RAR message can be preconfigured by the base station, and corresponds to the type of the random access. For instance, the contention-based random access procedure corresponds to the default and original format of the RAR message; the contention-free random access procedure corresponds to the format of the RAR message containing indication information and configured by the base station. For instance, the format may be a format of carrying indication information by a reserved bit R in the RAR message; alternatively, the format may be a format of carrying indication information by a newly added bit in the RAR message.

Thus, when the base station receives the random access preamble transmitted from the UE and generates the RAR message, it can generate the RAR message according to the preconfigured format of the random access response message corresponding to the type of the random access. Herein, the default original format in which no indication information is contained is used for the contention-based random access procedure; alternatively, the reserved bit R in the original format is set as "0", indicating the UE not to transmit the aperiodic SRS. A configured format of the random access response message corresponding to the contention-free random access procedure is used for the contention-free random access procedure, wherein if the base station determines that it is necessary for the UE to transmit the aperiodic SRS, the indication information is set as "1", otherwise the indication information is set as "0".

Step 602, in which the UE determines whether the type of the random access is a contention-free random access procedure or a contention-based random access procedure; if it is the contention-free random access procedure, Step 603 is executed, otherwise Step 607 is executed.

Step 603, in which if the type of the random access is a contention-free random access procedure in Step 602, the UE correspondingly processes the RAR message according to preconfigured format of the RAR message corresponding to the contention-free random access procedure, so as to obtain indication information contained in the RAR message;

wherein processing the RAR message is to decode the RAR message.

Step 604, in which it is determined whether the type of the indication information is to transmit the aperiodic SRS; if the determination result is yes, Step 605 is executed, otherwise Step 607 is executed;

wherein if the indication information is "1", this indicates to transmit the aperiodic SRS; if the indication information is "0", this indicates not to transmit the aperiodic SRS.

Step 605, in which the determination result in Step 604 is yes, namely the type of the indication information shows to transmit the aperiodic SRS, then the UE determines to transmit the aperiodic SRS.

Step 607, in which the determination result in Step 604 is no, namely the type of the indication information shows not to transmit the aperiodic SRS, then the UE determines not to transmit the aperiodic SRS.

Step 606, in which if the type of the random access is a contention-based random access procedure in Step 602, the UE processes the RAR message according to the default format of the RAR message; as can be known, the RAR message does not contain indication information, or the indication information is "0", and it is then determined not to transmit the aperiodic SRS.

As can be known from the above, the base station can trigger the UE to transmit the aperiodic SRS with the RAR message of the random access procedure, and the aperiodic SRS is transmitted on the unreleased resource, so that the base station rapidly obtains uplink channel state information (CSI) of the UE to thereby rapidly perform scheduling for a transmission of uplink data of the UE.

Figure 7:
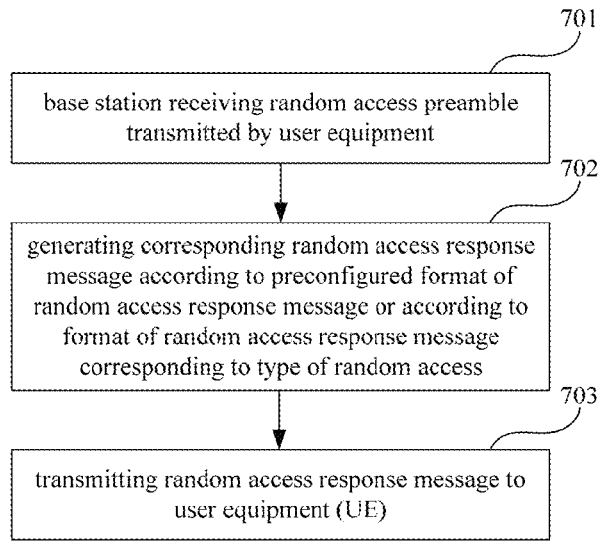
FIG. 7 is a flowchart of a method for triggering an aperiodic sounding reference symbol according to Embodiment 4.

FIG. 7 is a flowchart of a method for triggering an aperiodic sounding reference symbol according to Embodiment 4. In this embodiment, since the random access procedure can either be initiated by a UE itself or triggered by a base station, the UE transmits a random access preamble on the initiative of the UE or based on triggering of the base station. After the base station receives the random access preamble transmitted from the UE, if the base station needs the UE to transmit the aperiodic SRS, indication information indicating the UE to transmit the aperiodic SRS is carried in a returned RAR message, so as to trigger the UE to transmit the aperiodic SRS; otherwise, indication information indicating the UE not to transmit the aperiodic SRS is carried in the returned RAR message.

As shown in FIG. 7, the method comprises the following steps:

Step 701, in which the base station receives a random access preamble transmitted from the UE.

Step 702, in which a corresponding random access response message is generated according to a preconfigured format of the random access response message, or according to a preconfigured format of the random access response message corresponding to the type of the random access; wherein the random access response message contains indication information indicating the UE whether to transmit the aperiodic SRS.

Step 703, in which the random access response message is transmitted to the UE, so that the UE determines whether to transmit the aperiodic SRS according to the type of the indication information contained in the random access response message.

Here, if the base station triggers the random access procedure, the method further comprises triggering the UE by the base station to initiate the random access procedure, which is similar to the prior art, and will not be repetitively described here.

Here, if the base station needs the UE to transmit the aperiodic SRS, indication information indicating the UE to transmit the aperiodic SRS is carried in a returned RAR message, so as to trigger the UE to transmit the aperiodic SRS; otherwise, indication information indicating the UE not to transmit the aperiodic SRS is carried in the returned RAR message. Further, besides the aforementioned indication information, the RAR message may further contain other information of the random access procedure, such as time adjustment information for uplink synchronization, resources allocated to the UE for transmitting uplink data, and temporary radio network temporary identifier C-RNTI, etc.

In this embodiment, in Step 702, when the base station generates the corresponding RAR message according to the preconfigured format of the random access response message, the method specifically includes the following steps: when the base station receives the random access preamble transmitted from the UE, if it is determined according to the random access preamble that the random access procedure of the UE is a contention-based random access procedure, the indication information is set as "0" while generating the RAR message of the preconfigured format; if it is determined that the random access procedure of the UE is a contention-free random access procedure, the base station first determines whether it is necessary for the UE to transmit the aperiodic SRS; if it is determined that it is necessary for the UE to transmit the aperiodic SRS, the indication information can be set as "1"; if it is determined that it is not necessary for the UE to transmit the aperiodic SRS, the indication information can be set as "0".

In this embodiment, in Step 702, if the base station generates the corresponding random access response message according to the preconfigured format of the random access response message corresponding to the type of the random access, the method specifically includes the following steps.

When the base station receives the random access preamble transmitted from the UE, if it is determined according to the random access preamble that the random access procedure of the UE is a contention-based random access procedure, the RAR message of the default original format in which no indication information is contained can be generated; alternatively, the reserved bit R in the original format is set as "0", indicating the UE not to transmit the aperiodic SRS; if it is a contention-free random access procedure, a configured format of the random access response message corresponding to the contention-free random access procedure is used, wherein if the base station determines that it is necessary for the UE to transmit the aperiodic SRS, the indication information is set as "1", otherwise the indication information is set as "0".

In this embodiment, the indication information contained in the RAR message is carried by a reserved bit in the RAR message or a newly added bit, for instance, by a newly added bit in the uplink bandwidth grant (UL Grant) field. An example is taken below for explanation.

Figure 8:
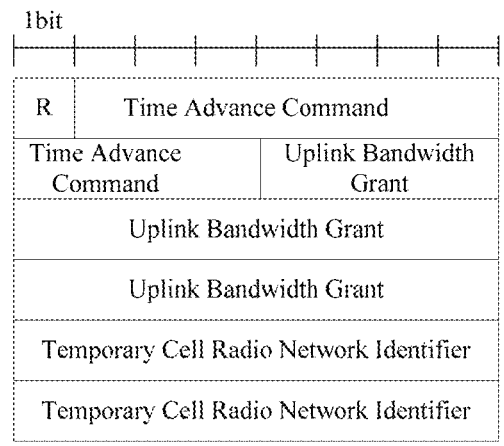
FIG. 8 is a schematic diagram of the format of an RAR message in prior art.
Figure 9:
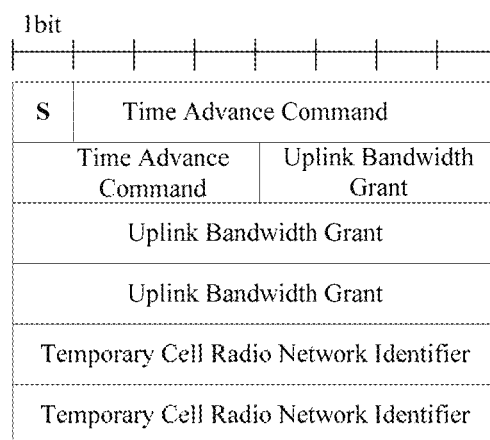
FIG. 9 is a format schematic diagram of the RAR message showing that a reserved bit "R" in an RAR message is used to carry indication information.
Figure 10:
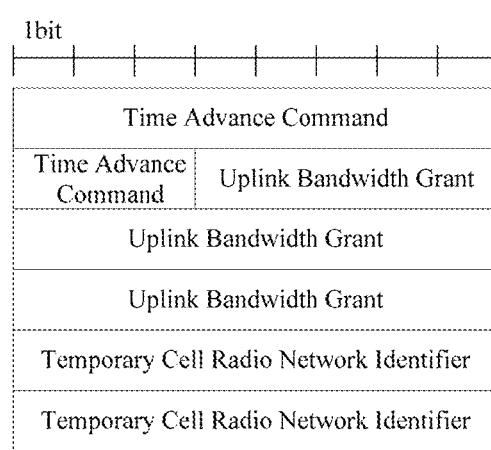
FIG. 10 is a format schematic diagram of the RAR message showing that a newly added bit in an RAR uplink bandwidth grant field is used to carry indication information.

FIG. 8 is a schematic diagram of the format of an RAR message in prior art, FIG. 9 is a format schematic diagram of the RAR message showing that a reserved bit "R" in an RAR message is used to carry indication information, wherein the bit representing the indication information is referred to as "S", and FIG. 10 is a format schematic diagram of the RAR message showing that a newly added bit in an RAR uplink bandwidth grant field is used to carry indication information.

As shown in FIG. 8, the meanings expressed by each of the fields are as follows:

R: reserved bit, which is usually set as 0;

Time Advance Command (TAC), for adjusting uplink transmission time of the UE;

Temporary Cell Radio Network Identifier (Temporary C-RNTI); and

Uplink Bandwidth Grant (UL Grant), for allocating the resource necessary for the UE to transmit uplink data, totaling 20 bits, and the parameters and number of bits as contained being as shown in Table 3.

TABLE 3

| Name of Parameter | Number of Bits |
| --- | --- |
| Hopping flag | 1 |
| Fixed size resource block assignment | 10 |
| Truncated modulation and coding scheme | 4 |
| TPC command for scheduled PUSCH | 3 |
| UL delay | 1 |
| CQI request | 1 |

As shown in FIG. 9, a reserved bit R is used to carry the indication information, and the reserved bit R is 1 bit. The Rbit is set as a bit "S" that triggers the aperiodic SRS. For instance, if the base station needs to trigger the UE to transmit the aperiodic SRS, S can be set as "1"; if the base station does not need to trigger the UE to transmit the aperiodic SRS, S can be set as "0". Thus, when the UE receives the RAR message in a format as shown in FIG. 9, corresponding decoding can be performed to obtain the indication information carried by the bit "S", and it is determined according to the type of the indication information whether to transmit the aperiodic SRS. Under such a circumstance, the original format of the RAR message is not much changed, and this facilitates practical application.

As shown in FIG. 10, a newly added bit is used to carry the indication information, for instance, a bit is newly added to the uplink bandwidth grant (UL Grant) field to trigger the aperiodic SRS. Thus, the number of bits in the UL grant field is 21 bits. The parameters and number of bits contained are as shown in Table 4.

TABLE 4

| Name of Parameter | Number of Bits |
| --- | --- |
| Hopping flag | 1 |
| Fixed size resource block assignment | 10 |

TABLE 4-continued

| Name of Parameter | Number of Bits |
| --- | --- |
| Truncated modulation and coding scheme | 4 |
| TPC command for scheduled PUSCH | 3 |
| UL delay | 1 |
| CQI request | 1 |
| A-SRS request | 1 |

As shown in Table 4, if the base station needs to trigger the UE to transmit the aperiodic SRS, the bit of the aperiodic SRS request can be set as "1"; if the base station does not need to trigger the UE to transmit the aperiodic SRS, the bit of the aperiodic SRS can be set as "0". Thus, when the UE receives the RAR message of a format as shown in FIG. 10, the corresponding decoding is performed to obtain the indication information carried by the aperiodic SRS request, and it is determined according to the type of the indication information whether to transmit the aperiodic SRS. Under such a circumstance, the original format of the RAR message is relatively greatly changed. As shown in FIG. 10, the total number of bits of the RAR message remains unchanged, as what is changed is merely the format of the RAR message, by adding the originally reserved bit R to the UL grant field.

As can be known from the above, since different carrying modes are used, the RAR message can correspond to different formats, and RAR messages of different formats correspond to different processing modes. Herein, the format of the RAR message can be preconfigured by the base station and notified to the UE, so that the UE performs a corresponding process according to the configured format on receipt of the RAR message. Alternatively, the base station preconfigures the corresponding format of the RAR message according to the type of the random access (that is to say, the format as shown in FIG. 9 or 10 can be configured for the contention-free random access procedure, while the format as shown in FIG. 8 can be configured for the contention-based random access procedure), and notifies the UE, so that the UE performs a corresponding process according to the configured format corresponding to the type of the random access on receipt of the RAR message.

Thus, the method may further include the following steps: the base station configures resource information used for the UE to transmit the aperiodic SRS, and the configured resource information is notified to the UE by radio resource control (RRC) signaling. Herein, the radio resource control signaling can be RRC connection setup signaling, or RRC connection reconfiguration signaling, or RRC connection reestablishment signaling. However, there is no restriction to these, as other signaling may as well be used on practical demand.

In this embodiment, the method further includes the following steps: the base station configures the format of the RAR message for the UE; the configured format of the RAR message is notified to the UE, so that the UE correspondingly processes the received RAR message according to the format of the random access response message. Herein, if the format of the RAR message is preconfigured, then in Step 701, after the base station receives the random access preamble transmitted from the UE, the base station generates the corresponding RAR message according to the preconfigured format of the RAR message, so that the UE performs a corresponding process after receiving the RAR message. Under such a circumstance, regardless of a contention-based or contention-free random access procedure, the format of the RAR message is preconfigured.

In this embodiment, the method further includes the following steps: the base station configures for the UE a format of the RAR message corresponding to the contention-free random access procedure; the configured format of the RAR message corresponding to the random access procedure is notified to the UE, so that the UE performs a corresponding process on the received RAR message according to the random access procedure and the format of the RAR message corresponding to the random access procedure. Herein, if the random access procedure is contention-based, the format of the RAR message can be preconfigured as the format shown in FIG. 8; if the random access procedure is contention-free, the format of the RAR message can be preconfigured as the format shown in FIG. 9 or 10; in Step 701, after the base station receives the random access preamble transmitted from the UE, the base station generates the corresponding RAR message according to the type of contention of the random access, so that the UE performs the corresponding process according to the type of contention of the random access after receiving the RAR message.

As can be known from the above embodiment, when the base station receives the random access preamble transmitted from the UE, the base station can return an RAR message in a corresponding format according to preconfiguration, so that the UE processes the RAR message according to the preconfigured format after receiving the RAR message transmitted from the base station to thereby obtain the corresponding indication information. When the indication information indicates the UE to transmit the aperiodic SRS, unreleased resource is used to transmit the aperiodic SRS to the base station, so that the base station rapidly obtains uplink channel state information (CSI) of the UE to thereby rapidly perform scheduling for a transmission of uplink data of the UE.

Figure 11:
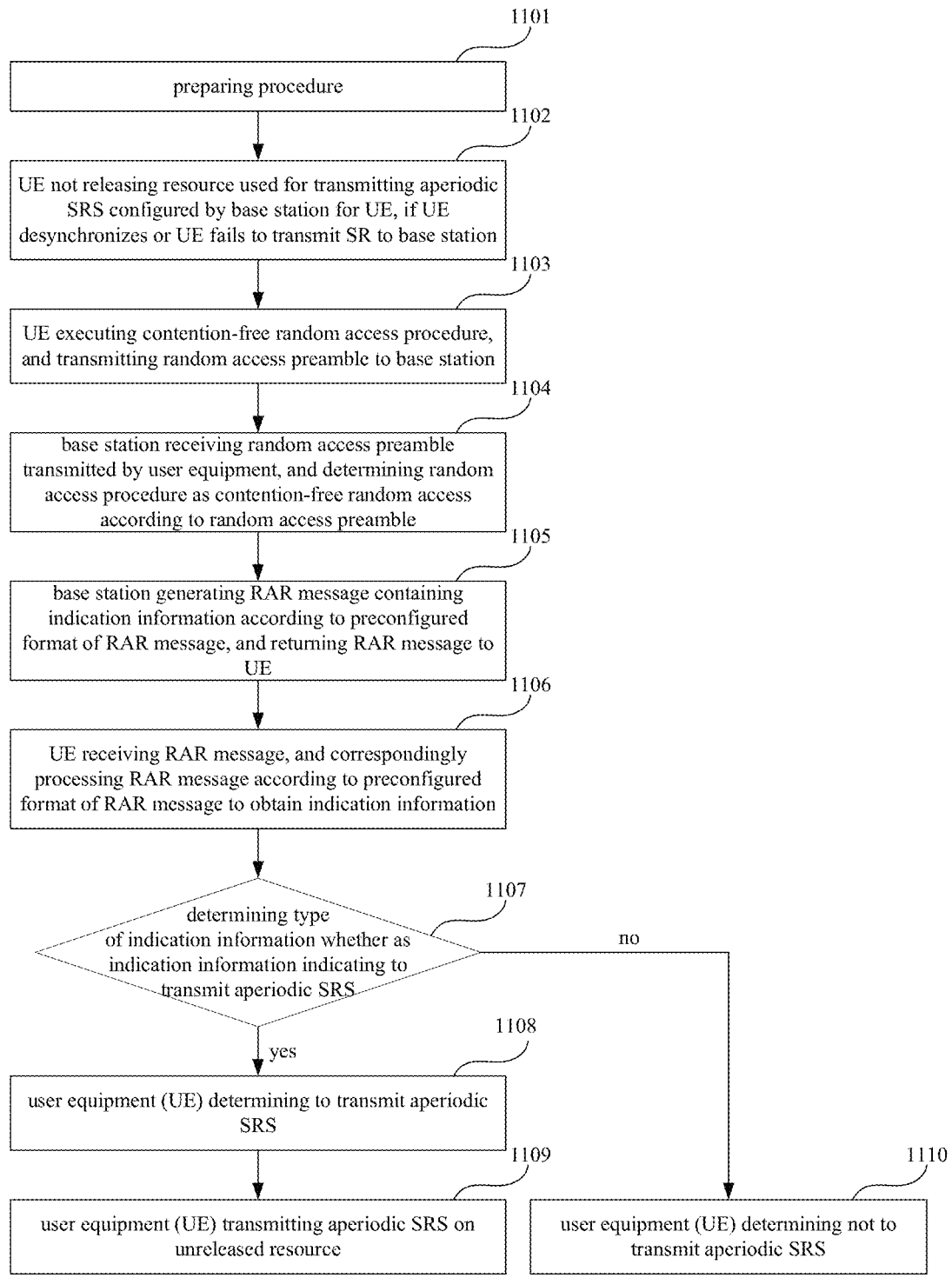
FIG. 11 is a flowchart of a method for triggering an aperiodic sounding reference symbol according to Embodiment 5.

FIG. 11 is a flowchart of a method for triggering an aperiodic sounding reference symbol according to Embodiment 5, in which the format of the RAR message as preconfigured by the base station being the format shown in FIG. 9 or 10 is taken for example for explanation, and this format is used regardless of a contention-based or contention-free random access procedure.

As shown in FIG. 11, the method comprises the following steps:

Step 1101, in which the procedure is prepared;

The base station configures resource information used for the UE to transmit the aperiodic SRS, and the configured resource information is notified to the UE through radio resource control (RRC) signaling;

wherein the RRC signaling is as previously described, and no repetition will be made here;

Further, the base station configures for the UE a format of the random access response (RAR) message, for instance, the format as shown in FIG. 9, and notifies the UE;

After receiving the resource information transmitted from the base station, the UE stores the resource information, and after receiving the format of the RAR message configured by the base station, the UE stores format information.

Step 1102, in which if the UE desynchronizes or the UE fails to transmit a scheduling request (SR) to the base station, the UE does not release the resource configured by the base station for the UE to transmit the aperiodic SRS;

Step 1103, in which the UE executes a random access procedure;

wherein if the UE executes a contention-free random access, the UE transmits to the base station a particular conflict-free random access preamble according to a particular random access preamble sequence notified by the base station.

Step 1104, in which the base station receives the random access preamble transmitted from the UE, and determines the random access procedure as contention-free random access according to the random access preamble.

Step 1105, in which the base station generates an RAR message according to a preconfigured format of the RAR message, and returns the RAR message to the UE;

The RAR message contains indication information indicating the UE whether to transmit the aperiodic SRS, wherein when the RAR message is generated, if the base station determines that it is necessary for the UE to transmit the aperiodic SRS, the indication information can be set as "1"; if it is determined that it is not necessary for the UE to transmit the aperiodic SRS, the indication information can be set as "0".

Step 1106, in which the UE receives the RAR message, and correspondingly processes the RAR message according to the preconfigured format of the RAR message, to obtain the indication information.

Step 1107, in which it is determined whether the type of the indication information shows to transmit the aperiodic SRS; if the determination result is yes, Step 1108 is executed, otherwise Step 1110 is executed.

wherein if the indication information is "1", this indicates to transmit the aperiodic SRS; if the indication information is "0", this indicates not to transmit the aperiodic SRS.

Step 1108, in which the determination result is yes in Step 1107, then the UE determines to transmit the aperiodic SRS.

Step 1109, in which the UE transmits the aperiodic SRS on an unreleased resource allocated by the base station to the UE.

Step 1110, in which the determination result is no in Step 1107, then the UE determines not to transmit the aperiodic SRS.

As can be known from the above embodiment, when the UE executes a contention-free random access procedure, if the RAR message returned by the base station is received, the random access completes. Moreover, it can be determined according to the type of the indication information contained in the RAR message whether to transmit the aperiodic SRS; and if the determination result is to transmit the aperiodic SRS, the UE makes use of the unreleased resource to transmit the aperiodic SRS.

In Step 1103 of Embodiment 5 illustrated by FIG. 11, if the UE executes the random access procedure, and in this case, if the UE initiates a contention-based random access, the UE transmits a contention-based random access preamble to the base station.

Thus, in Step 1104, the base station receives the random access preamble transmitted from the UE, and determines the random access procedure as contention-based random access according to the random access preamble. In Step 1105, the base station generates an RAR message according to a preconfigured format of the RAR message, and returns the RAR message to the UE; wherein the RAR message contains indication information indicating the UE whether to transmit the aperiodic SRS; and wherein when the RAR message is generated, the base station sets the indication information as "0". Moreover, the remaining steps are similar to those shown in FIG. 11, and are not repetitively described here.

As can be known from the above embodiment, when the UE initiates the contention-based random access procedure, if the RAR message returned by the base station is received, it is possible to determine not to transmit the aperiodic SRS according to the type of the indication information contained in the RAR message.

Figure 12:
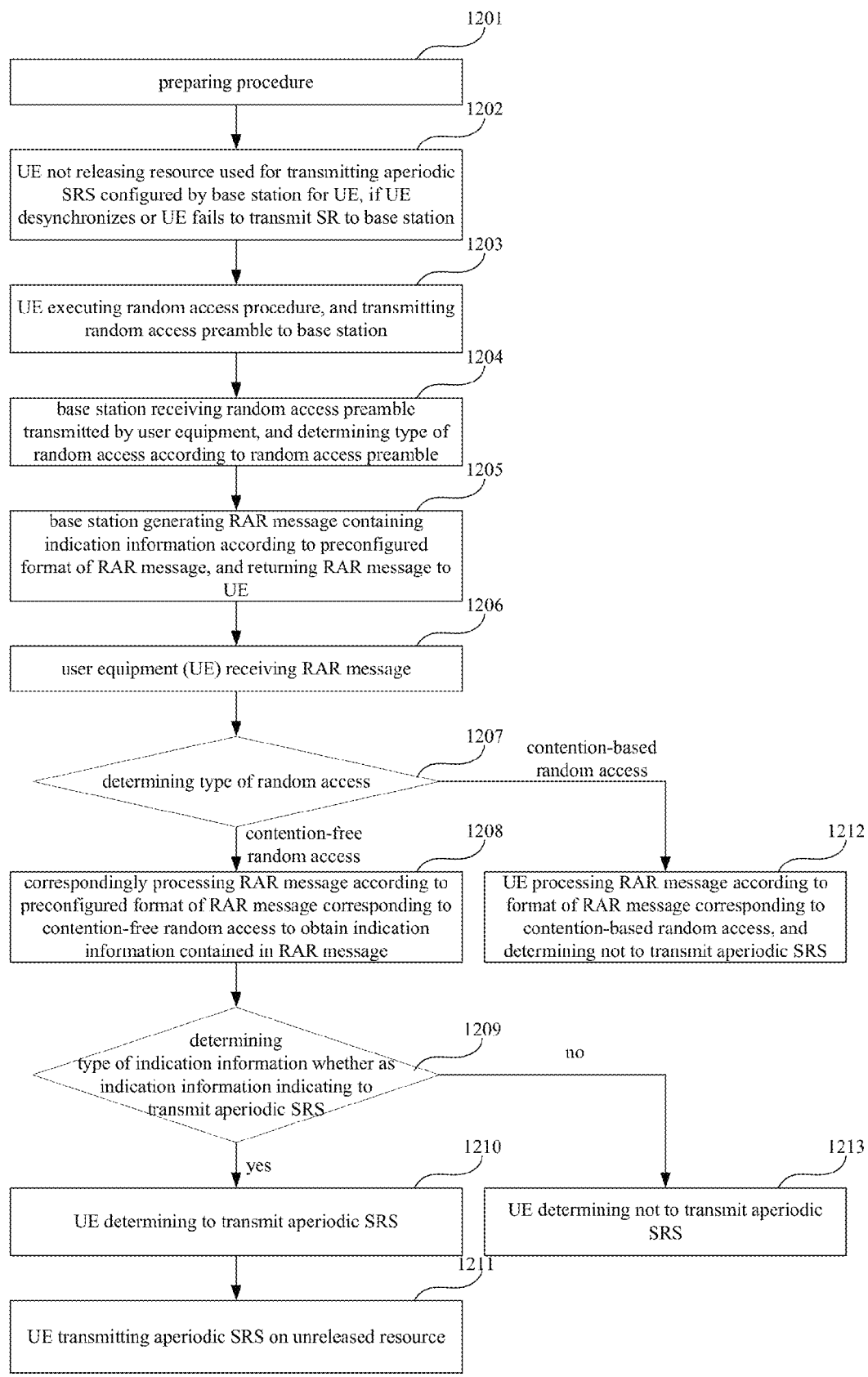
FIG. 12 is a flowchart of a method for triggering an aperiodic sounding reference symbol according to Embodiment 6.

FIG. 12 is a flowchart of a method for triggering an aperiodic sounding reference symbol according to Embodiment 6, in which the base station preconfiguring a format of the RAR message corresponding to the type of the random access is taken as example for explanation, wherein in the case of a contention-based random access, the configured format is the format as shown in FIG. 8; in the case of a contention-free random access, the configured format is the format as shown in FIG. 9 or 10.

As shown in FIG. 12, the method comprises the following steps:

Step 1201, in which the procedure is prepared;

The base station configures resource information used for the UE to transmit the aperiodic SRS, and the configured resource information is notified to the UE through radio resource control signaling;

wherein the radio resource control signaling is as previously described, and no repetition will be made here;

Further, the base station configures for the UE a format of the random access response (RAR) message corresponding to the type of the random access, and notifies the UE;

After receiving the resource information transmitted from the base station, the UE stores the resource information, and after receiving the format of the RAR message corresponding to the type of the random access configured by the base station, the UE stores format information.

Step 1202, in which if the UE desynchronizes or the UE fails to transmit a scheduling request (SR) to the base station, the UE does not release the resource configured by the base station for the UE to transmit the aperiodic SRS.

Step 1203, in which the UE executes a random access procedure;

wherein if the UE executes a contention-free random access, the UE transmits to the base station a particular conflict-free random access preamble according to a particular random access preamble sequence notified by the base station.

If the UE initiates a contention-based random access, the UE transmits to the base station a contention-based random access preamble.

Step 1204, in which the base station receives the random access preamble transmitted from the UE, and determines the type of the random access procedure according to the random access preamble.

Step 1205, in which the base station generates an RAR message according to a preconfigured format of the RAR message corresponding to the type of the random access, and returns the RAR message to the UE;

Herein, if the type of the random access is a contention-based random access procedure, an RAR message of the format shown in FIG. 8 is generated, wherein the RAR message does not contain indication information, or the reserved bit in the format as shown in FIG. 8 is set as "0";

If the type of the random access is a contention-free random access procedure, the base station generates an RAR message of a format shown in FIG. 9 or 10 according to preconfiguration, and the RAR message contains indication information indicating the UE whether to transmit the aperiodic SRS; if it is needed for the UE to transmit the aperiodic SRS, the indication information can be "1", otherwise the indication information can be "0".

Step 1206, in which the UE receives the RAR message.

Step 1207, in which it is determined whether the type of the random access is a contention-free or a contention-based random access procedure; if the determination result shows a contention-free random access procedure, Step 1208 is executed, otherwise Step 1212 is executed.

Step 1208, in which if the determination result in Step 1207 shows the contention-free random access, the UE correspondingly processes the RAR message according to the preconfigured format of the RAR message corresponding to the contention-free random access, to obtain indication information contained in the RAR message.

Steps 1209-1211 and 1213 are similar to Steps 1107-1110 as shown in FIG. 11, and are hence not repetitively described here.

Step 1212, in which if the determination result in Step 1207 shows the contention-based random access, the UE correspondingly processes the RAR message according to the preconfigured format of the RAR message corresponding to the contention-based random access, such as the format shown in FIG. 8; if no indication information is obtained or if the indication information as obtained is "0", the UE determines not to transmit the aperiodic SRS.

As can be known from the above embodiment, the base station can preconfigure the resource set for the UE to transmit the aperiodic SRS and the format of the RAR message, and notify the UE; after time-over of a time advance timer (TAT) or after failure to transmit a scheduling request (SR) over PUCCH (a maximum number of transmissions of the scheduling request has been reached), the UE does not release the resource configured for it by the base station to transmit the aperiodic SRS; it is possible to determine to transmit the aperiodic SRS according to the indication information in the random access response message of the random access procedure transmitted by the base station, and to transmit the aperiodic SRS on the unreleased resource, so that the base station rapidly obtains uplink channel state information (CSI) of the UE to thereby rapidly perform scheduling for a transmission of uplink data of the UE.

Certain embodiments further provide a base station and a user equipment, as described with reference to the embodiments below. Since the principles whereby the base station and the user equipment resolve the problems are similar to the principles whereby the methods for triggering a sounding reference symbol based on the base station and the user equipment solve the problems, implementation of the base station and the user equipment may refer to the implementation of the methods, and repetitive contents will not be reiterated in this context.

Figure 13:
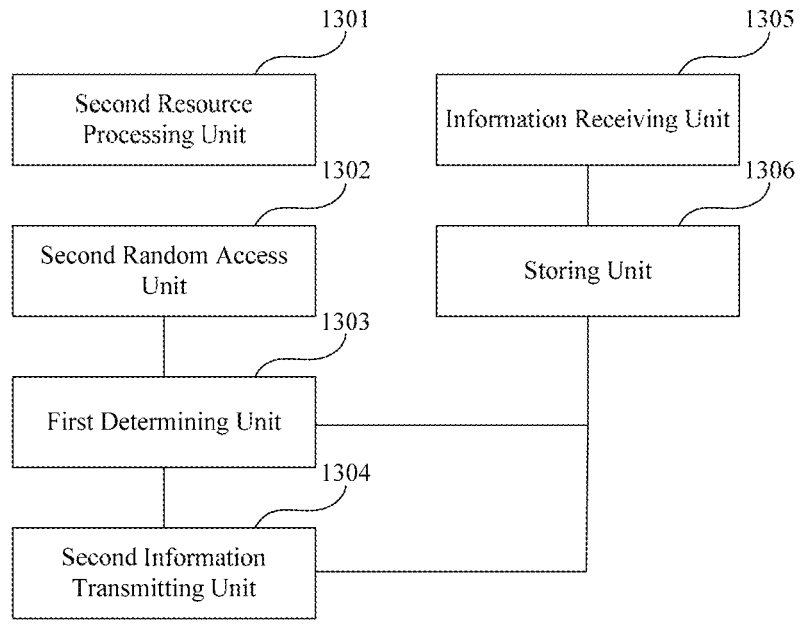
FIG. 13 is a structural diagram of a user equipment according to Embodiment 7.

FIG. 13 is a structural diagram of a user equipment according to Embodiment 7. As shown in FIG. 13, the user equipment comprises a second resource processing unit 1301, a second random access unit 1302, a first determining unit 1303 and a second information transmitting unit 1304; wherein the second resource processing unit 1301 does not release a resource used for transmitting an aperiodic SRS configured by a base station for the user equipment (UE) when the UE desynchronizes or the UE fails to transmit a scheduling request (SR) to the base station;

the second random access unit 1302 executes a random access procedure, in which the transmission of random access preamble may be initiated by itself or triggered by the base station;

the first determining unit 1303 determines whether to transmit the aperiodic SRS according to the type of indication information contained in a random access response message transmitted by the base station;

the second information transmitting unit 1304 transmits the aperiodic SRS on the resource configured by the base station for the UE to transmit the aperiodic SRS, when the UE determines to transmit the aperiodic SRS.

The operational flow of the UE is similar to that of Embodiment 3, and is hence not repetitively described here.

In certain embodiments, the UE can process the received RAR message according to the format of the RAR message preconfigured by the base station, so as to obtain the indication information contained in the RAR message.

Figure 14:
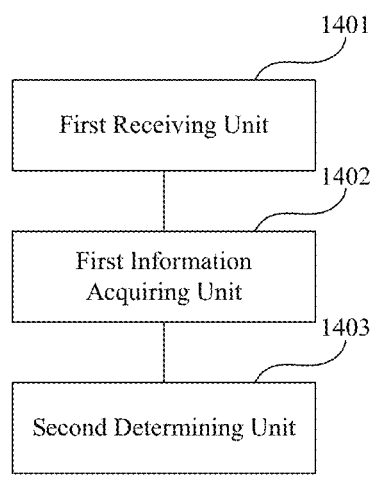
FIG. 14 is one of the structural diagrams of the first determining unit of Embodiment 7.

Thus, in this embodiment, as shown in FIG. 14, the first determining unit 1303 may include the component parts as described below.

FIG. 14 is a structural diagram of the first determining unit of Embodiment 7. As shown in FIG. 14, the first determining unit includes a first receiving unit 1401, a first information acquiring unit 1402 and a second determining unit 1403; wherein the first receiving unit 1401 receives the RAR message transmitted from the base station;

the first information acquiring unit 1402 correspondingly processes the RAR message according to the preconfigured format of the RAR message so as to acquire indication information contained in the RAR message;

the second determining unit 1403 determines to transmit the aperiodic SRS when the type of the indication information shows to transmit the aperiodic SRS, and determines not to transmit the aperiodic SRS when the type of the indication information shows not to transmit the aperiodic SRS.

The operational flow of the first determining unit as shown in FIG. 14 is similar to the flow as shown in FIG. 5, and is hence not repetitively described here.

Figure 15:
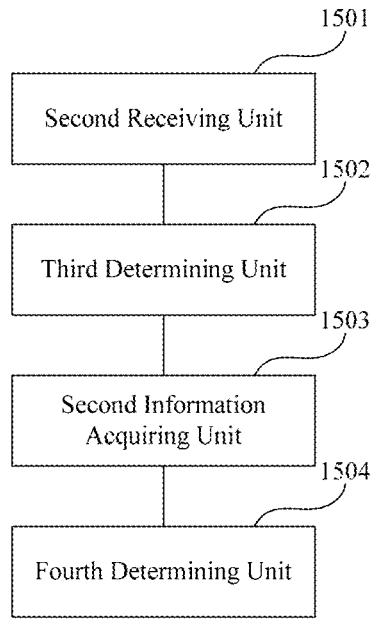
FIG. 15 is another one of the structural diagrams of the first determining unit of Embodiment 7.

In certain embodiments, the UE processes the received RAR message according to the format of the RAR message preconfigured by the base station and corresponding to the type of the random access, and processes the RAR message according to the preconfigured format in the case of the contention-free random access; in the case of contention-based random access, the RAR message is processed according to the preconfigured format; only when the RAR message is processed by using the format corresponding to the contention-free random access and the acquired indication information indicates to transmit the aperiodic SRS, the UE determines to transmit the aperiodic SRS. Thus, the first determining unit 1303 may include the component parts as described below:

FIG. 15 is a structural diagram of the first determining unit of Embodiment 7. As shown in FIG. 15, the first determining unit includes a second receiving unit 1501, a third determining unit 1502, a second information acquiring unit 1503 and a fourth determining unit 1504; wherein the second receiving unit 1501 receives an RAR message transmitted from the base station;

the third determining unit 1502 determines whether the type of the random access is contention-free or contention-based random access;

the second information acquiring unit 1503 correspondingly processes the RAR message according to the preconfigured format of the RAR message corresponding to the type of the random access when the type of the random access is the contention-free random access, so as to acquire indication information contained in the RAR message;

the fourth determining unit 1504 determines to transmit the aperiodic SRS when the type of the indication information shows to transmit the aperiodic SRS.

The operational flow of the first determining unit as shown in FIG. 15 is similar to the flow as shown in FIG. 6, and is hence not repetitively described here.

Furthermore, as shown in FIG. 13, the user equipment may further include an information receiving unit 1305 for receiving resource information from the base station configured by the base station for the UE to transmit the aperiodic SRS; or for further receiving format information of the RAR message configured by the base station; or for further receiving format information of the RAR message corresponding to the type of the random access configured by the base station.

Moreover, the UE may further include a storing unit 1306 for storing the received resource information or format information for use by the UE to acknowledge and transmit the aperiodic SRS.

As can be known from the above embodiment, the UE does not release the resource used for transmitting an aperiodic SRS configured by the base station for the UE, if the UE desynchronizes or the UE fails to transmit a scheduling request (SR) to the base station; it is possible to determine to transmit the aperiodic SRS according to the indication information in the random access response message of the random access procedure transmitted by the base station, and to transmit the aperiodic SRS on the unreleased resource, so that the base station rapidly obtains uplink channel state information (CSI) of the UE to thereby rapidly perform scheduling for a transmission of uplink data of the UE.

Figure 16:
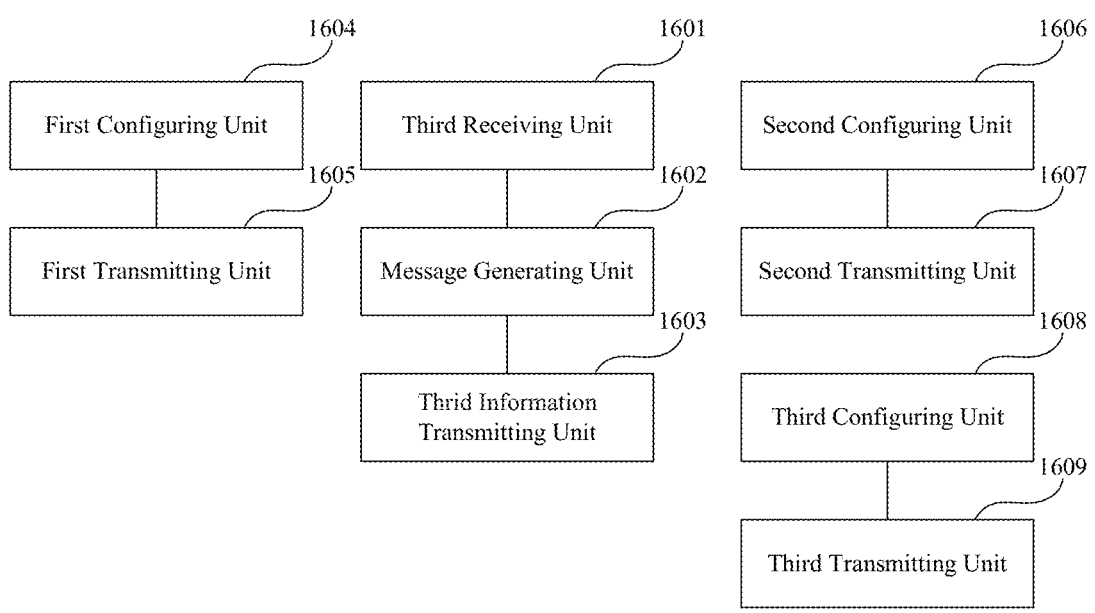
FIG. 16 is a structural diagram of a base station according to Embodiment 8.

FIG. 16 is a structural diagram of a base station according to Embodiment 8. As shown in FIG. 16, the base station includes a third receiving unit 1601, a message generating unit 1602 and a third information transmitting unit 1603; wherein the third receiving unit 1601 receives a random access preamble transmitted by a user equipment (UE), wherein the user equipment transmits the random access preamble on its own initiative, or the user equipment transmits the random access preamble based on triggering by the base station;

the message generating unit 1602 generates a corresponding random access response message according to a preconfigured format of the random access response message or according to a preconfigured format of the random access response message corresponding to the type of the random access, wherein the random access response message contains therein indication information indicating the user equipment whether to transmit the aperiodic sounding reference symbol;

the third information transmitting unit 1603 transmits the random access response message to the user equipment (UE), so that the UE determines whether to transmit the aperiodic sounding reference symbol according to the type of the indication information contained in the random access response message.

In the case where the base station triggers the UE to transmit the random access preamble, the base station further comprises a transmitting unit (not shown in the drawings) for transmitting to the UE a preamble sequence and a resource for performing the random access procedure, so as to trigger the UE to transmit the random access preamble.

The operational flow of the UE is similar to that of Embodiment 4, and is hence not repetitively described here.

As shown in FIG. 16, the base station further includes a first configuring unit 1604 and a first transmitting unit 1605; wherein the first configuring unit 1604 configures for the UE resource information used for transmitting the aperiodic SRS, and the first transmitting unit 1605 transmits the configured resource information to the UE through radio resource control signaling.

As shown in FIG. 16, the base station may further include a second configuring unit 1606 and a second transmitting unit 1607, wherein the second configuring unit 1606 configures a format of the RAR message for the UE, and the second transmitting unit 1607 notifies the UE of the configured format of the RAR message, so that the UE correspondingly processes the received RAR message according to the format of the RAR message.

As shown in FIG. 16, the base station may further include a third configuring unit 1608 and a third transmitting unit 1609, wherein the third configuring unit 1608 configures a format of the RAR message corresponding to the type of the random access for the UE, and the third transmitting unit 1609 notifies the UE of the configured format of the RAR message corresponding to the type of the random access, so that the UE correspondingly processes the received random access response message according to the type of the random access and the format of the random access response message corresponding to the type of the random access.

As can be known from the above embodiment, the base station can preconfigure the resource set for the user equipment to transmit the aperiodic SRS and the format of the RAR message, and notify the UE; when the UE desynchronizes or fails to transmit a scheduling request (SR), the UE does not release the resource configured for it by the base station to transmit the aperiodic SRS; it is possible to determine to transmit the aperiodic SRS according to the indication information in the random access response message of the random access procedure transmitted by the base station, and to transmit the aperiodic SRS on the unreleased resource, so that the base station rapidly obtains uplink channel state information (CSI) of the UE to thereby rapidly perform scheduling for a transmission of uplink data of the UE.

Certain embodiments further provides a computer-readable program, wherein when the program is executed in a user equipment, the program enables the computer to carry out the method for triggering an aperiodic sounding reference symbol according to Embodiment 1 or Embodiment 3 in the user equipment.

Certain embodiments further provides a storage medium in which a computer-readable program is stored, wherein the computer-readable program enables the computer to carry out the method for triggering an aperiodic sounding reference symbol according to Embodiment 1 or Embodiment 3 in a user equipment.

Certain embodiments further provide a computer-readable program, wherein when the program is executed in a base station, the program enables the computer to carry out the method for triggering an aperiodic sounding reference symbol according to Embodiment 4 in the base station.

Certain embodiments further provide a storage medium in which a computer-readable program is stored, wherein the computer-readable program enables the computer to carry out the method for triggering an aperiodic sounding reference symbol according to Embodiment 4 in the base station.

The aforementioned devices and methods of the present invention may be implemented by hardware or by hardware in combination with software. The present invention relates to such a computer-readable program that, when executed by a logical component part, enables the logical component part to implement the aforementioned devices or component parts, or enables the logical component part to realize the aforementioned methods or steps. The present invention further relates to a storage medium for storing the program, such as a hard disk, a magnetic disk, an optical disk, a DVD, or a flash memory, and so on.

The present invention is described above with reference to specific embodiments. However, as should be clear to persons skilled in the art, these descriptions are all exemplary in nature, rather than restrictive to the protection scope of the present invention. Persons skilled in the art may make various changes and modifications to the present invention within the spirits and principles of the present invention, and all these changes and modifications all fall within the scope of the present invention.

The invention claimed is:

1. A method for triggering an aperiodic sounding reference symbol, comprising:

not releasing by user equipment a resource used for transmitting an aperiodic sounding reference symbol configured by a base station for the user equipment, when the user equipment desynchronizes or the user equipment fails to transmit a scheduling request to the base station;

initiating by the user equipment a random access procedure; and transmitting by the user equipment the aperiodic sounding reference symbol on the unreleased resource used for transmitting an aperiodic sounding reference symbol configured by a base station for the user equipment according to an indication information issued by the base station for indicating the user equipment to transmit an aperiodic sounding reference symbol if the random access succeeds.

2. A method for triggering an aperiodic sounding reference symbol, comprising:

not releasing by user equipment a resource used for transmitting an aperiodic sounding reference symbol configured by a base station for the user equipment, if the user equipment desynchronizes or the user equipment fails to transmit a scheduling request to the base station;

executing a random access procedure by the user equipment;

determining by the user equipment whether to transmit an aperiodic sounding reference symbol according to a type of indication information contained in a random access response message transmitted by the base station indicating the user equipment whether to transmit an aperiodic sounding reference symbol; and transmitting by the user equipment the aperiodic sounding reference symbol on the unreleased resource used for transmitting an aperiodic sounding reference symbol configured by the base station for the user equipment if the user equipment determines to transmit the aperiodic sounding reference symbol.

3. The method according to claim 2, wherein the indication information contained in the random access response message is borne by a reserved bit or a newly added bit in the random access response message.

4. The method according to claim 2, wherein the determining by the user equipment whether to transmit an aperiodic sounding reference symbol according to the type of the indication information contained in a random access response message transmitted by the base station comprises:

receiving by the user equipment the random access response message transmitted by the base station;

processing the random access response message according to a preconfigured format of the random access response message so as to obtain the indication information contained in the random access response message; and determining by the user equipment to transmit the aperiodic sounding reference symbol if the type of the indication information is the indication information for transmitting the aperiodic sounding reference symbol.

5. The method according to claim 2, wherein the determining by the user equipment whether to transmit an aperiodic sounding reference symbol according to the type of the indication information contained in a random access response message transmitted by the base station comprises:

receiving by the user equipment the random access response message transmitted by the base station;

processing the random access response message by the user equipment according to a preconfigured format of the random access response message corresponding to a contention-free random access procedure so as to obtain the indication information contained in the random access response message if the type of the random access is a contention-free random access procedure; and determining by the user equipment to transmit the aperiodic sounding reference symbol if the type of the indication information is the indication information for transmitting the aperiodic sounding reference symbol.

6. The method according to claim 2, wherein the method further comprises:
receiving the resource used for transmitting an aperiodic sounding reference symbol configured by the base station for the user equipment; or
receiving the format of the random access response message configured by the base station for the user equipment; or
receiving the format of the random access response message corresponding to the type of the random access configured by the base station for the user equipment.

7. A method for triggering an aperiodic sounding reference symbol, comprising:
receiving by a base station a random access preamble transmitted by user equipment;
generating a corresponding random access response message according to a preconfigured format of the random access response message or according to the preconfigured format of the random access response message corresponding to the type of the random access, wherein indication information indicating whether the user equipment to transmit an aperiodic sounding reference symbol is contained in the random access response message; and
transmitting to the user equipment the random access response message such that the user equipment determines whether to transmit an aperiodic sounding reference symbol according to a type of the indication information contained in the random access response message and transmits the aperiodic sounding reference symbol on an unreleased resource used for transmitting an aperiodic sounding reference symbol configured by the base station for the user equipment when the user equipment determines to transmit the aperiodic sounding reference symbol.

8. The method according to claim 7, wherein the indication information contained in the random access response message is borne by a reserved bit or a newly added bit in the random access response message.

9. The method according to claim 7, wherein the method further comprises:
configuring, by the base station for the user equipment, resource information used for transmitting the aperiodic sounding reference symbol; and
notifying the user equipment of the configured resource information via wireless resource control signaling.

10. The method according to claim 9, wherein the wireless resource control signaling is wireless resource control connection establishing signaling, or wireless resource control connection reconfiguring signaling, or wireless resource control connection reestablishing signaling.

11. The method according to claim 7, wherein the method further comprises:
configuring by the base station for the user equipment the format of the random access response message; and
notifying the user equipment of the configured format of the random access response message such that the user equipment processes the received random access response message according to the configured format of the random access response message.

12. The method according to claim 7, wherein the method further comprises:
configuring by the base station for the user equipment the format of the random access response message corresponding to the type of the random access; and
notifying the user equipment of the configured format of the random access response message corresponding to the type of the random access such that the user equipment processes the received random access response message according to the format of the random access response message corresponding to the type of the random access.

13. A user equipment, comprising:
a first resource processing unit not to release a resource used for transmitting an aperiodic sounding reference symbol configured by a base station for the user equipment when the user equipment desynchronizes or the user equipment fails to transmit a scheduling request to the base station;
a first random access unit to execute a random access procedure to the base station; and
a first information transmitting unit to transmit the aperiodic sounding reference symbol on the unreleased resource used for transmitting an aperiodic sounding reference symbol configured by the base station for the user equipment according to an indication information issued by the base station for indicating the user equipment to transmit an aperiodic sounding reference symbol when the random access succeeds.

14. A user equipment, comprising:
a second resource processing unit not to release a resource used for transmitting an aperiodic sounding reference symbol configured by a base station for the user equipment when the user equipment desynchronizes or the user equipment fails to transmit a scheduling request to the base station;
a second random access unit to execute a random access procedure to the base station;
a first determining unit to determine whether to transmit an aperiodic sounding reference symbol according to a type of indication information contained in a random access response message transmitted by the base station indicating the user equipment whether to transmit an aperiodic sounding reference symbol; and
a second information transmitting unit to transmit the aperiodic sounding reference symbol on the unreleased resource used for transmitting an aperiodic sounding reference symbol configured by the base station for the user equipment when the user equipment determines to transmit the aperiodic sounding reference symbol.

15. A base station, comprising:
a third receiving unit to receive a random access preamble transmitted by an user equipment;
a message generating unit to generate a corresponding random access response message according to a preconfigured format of the random access response message or according to the preconfigured format of the random access response message corresponding to the type of the random access, wherein indication information indicating whether the user equipment to transmit an aperiodic sounding reference symbol is contained in the random access response message; and
a third information transmitting unit to transmit to the user equipment the random access response message such that the user equipment determines whether to transmit an aperiodic sounding reference symbol according to the type of the indication information contained in the random access response message and transmits the aperiodic sounding reference symbol on an unreleased resource used for transmitting an aperiodic sounding reference symbol configured by the base station for the user equipment when the user equipment determines to transmit the aperiodic sounding reference symbol.

* * * * *